Dec. 14, 1965  F. J. SABO  3,222,761
PROCESS OF FORMING CUP-SHAPED ARTICLES
Filed Nov. 29, 1957  2 Sheets-Sheet 1

INVENTOR.
FRANK JOHN SABO
BY *M. A. Hobbs*
ATTORNEY

Dec. 14, 1965   F. J. SABO   3,222,761
PROCESS OF FORMING CUP-SHAPED ARTICLES
Filed Nov. 29, 1957   2 Sheets-Sheet 2

INVENTOR.
FRANK JOHN SABO
BY
ATTORNEY

United States Patent Office 3,222,761
Patented Dec. 14, 1965

3,222,761
PROCESS OF FORMING CUP-SHAPED ARTICLES
Frank J. Sabo, South Bend, Ind., assignor to Arrowhead Engineering Corporation, Walkerton, Ind., a corporation of Indiana
Filed Nov. 29, 1957, Ser. No. 699,665
8 Claims. (Cl. 29—156.5)

The present invention relates to a process of fabricating duplex metal cup-shaped articles.

One of the principal objects of the present invention is to provide a process of forming a metallic cup-shaped article which is light in weight and strong and sturdy in construction.

Another object of the invention is to provide a process of forming a cup-shaped article constructed of one metal, such as aluminum alloy, and having an insert of another metal, such as steel, firmly seated in and secured to the bottom of the article.

Another object is to provide a process for fabricating cup-shaped articles of the foregoing type, which forms the article and secures the insert in place in the bottom of the article using relatively simple dies and standard metal fabricating equipment.

Still another object of the invention is to provide a process for forming cup-shaped articles of the aforesaid type wherein a special blank is used with the fabricating equipment for centering the insert in the bottom of the article during the fabricating operation.

A further object is to provide a process of forming an aluminum cup-shaped piston having a steel disc-shaped insert seated on the internal side of the closed end and forming the point of contact between the piston and a rod or member for operating the piston.

Further objects and advantages of the invention will become apparent from the following description and accompanying drawings, wherein.

Figure 3:
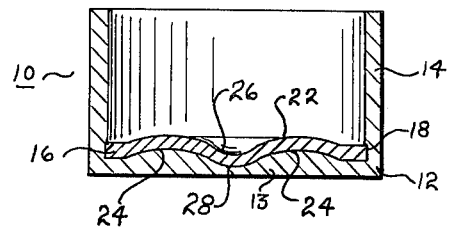
FIGURE 3 is a vertical cross sectional view of the cup-shaped article shown in FIGURES 1 and 2, taken on line 3—3 of FIGURE 2.

Referring more specifically to the drawings, numeral 10 designates generally the present cup-shaped article, 12 the cup-shaped portion of the article having cylindrical side walls 14 and disc-shaped end member 13 joined integrally to the lower end of the side walls. A disc-shaped metal insert 16 is seated in the bottom of cup-shaped portion 12 and is secured therein by the marginal portion of the insert extending into a shallow annular groove 18 at the bottom of the internal surface of the side walls. The cup-shaped article shown in the drawings is intended primarily for use as a piston, such as those used for operating the shoes of a hydraulic brake system for automobiles, trucks and similar vehicles. The size of the piston may vary from one size or type of vehicle to another, but the general construction of the present piston consisting of cup-shaped portion 12 and insert 16 remains the same.

The particular shape of insert 16 is important in the construction and use of the cup-shaped article and also in the fabricating operation. The insert is generally disc-shaped with an annular concentric rib or ridge 22 on the upper surface spaced from the edge of the insert and a corresponding annular concentric groove 24 on the lower surface. The center portion of the insert is concave on the upper surface and convex on the lower surface, forming a distinct recess 26 in the upper surface and a protrusion 28 on the lower surface. The annular rib and protrusion impart substantial strength to the insert so that a relatively thin insert can be used to give substantial strength to the end of the cup-shaped portion 12. In addition to the added strength given to the end structure of the cup-shaped article, this insert forms a contact member for the piston rod of a brake shoe operating mechanism and, being of harder and more durable material than the remainder of the piston, greatly increases the life of the piston. While various materials may be used in the construction of the present article, in one embodiment cup-shaped portion 12 is made of aluminum and insert 16 is made of steel. This combination of materials provides a light weight article with a relatively thin yet strong end portion.

Figure 8:
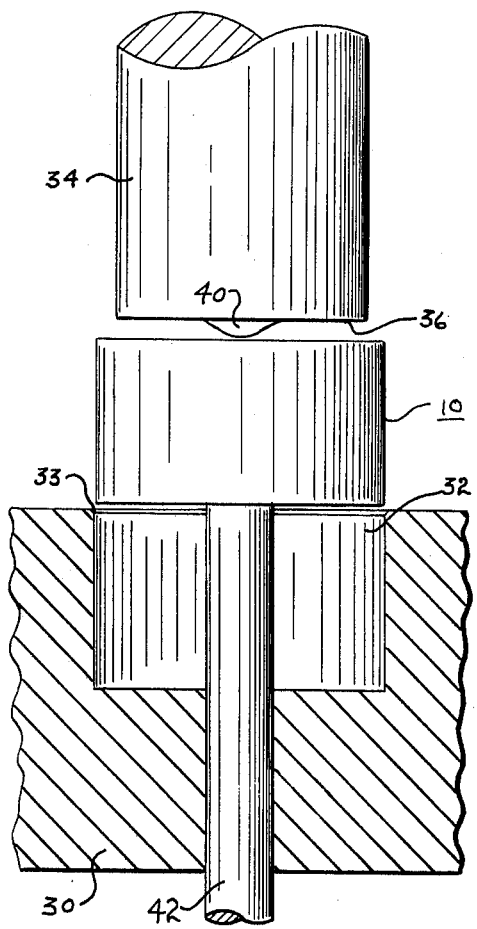
FIGURE 8 is a fragmentary vertical cross sectional view of the die and plunger shown in FIGURES 6 and 7, showing the plunger withdrawn from the die and the newly formed cup-shaped article being ejected from the die.
Figure 9:
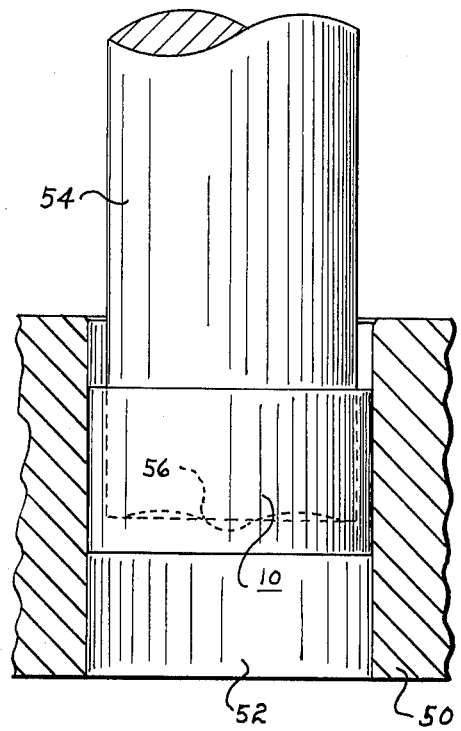
FIGURE 9 is a fragmentary vertical cross sectional view of a sizing die and elevational view of a plunger, showing a cup-shaped article being worked to final dimensions.
Figure 4:
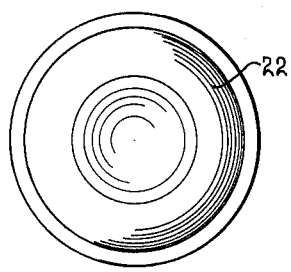
FIGURE 4 is a top plan view of a blank used in the forming of the cup-shaped articles shown in the preceding figures.
Figure 5:
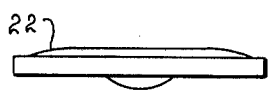
FIGURE 5 is a side elevational view of the blank shown in FIGURE 4.

The steps of my process for fabricating the present cup-shaped article and the equipment used in carrying out this process are illustrated in FIGURES 6 through 9. The die consists of a heavy metal plate 30 having a die cavity 32 of substantially the size and shape of the outside configuration of the article, terminating at the upper surface in an outwardly extending beveled edge 33. The die plate is mounted rigidly in a press with the cavity facing upwardly as shown and a reciprocable cylindrical plunger 34 is mounted in the press thereabove in axial alignment with the cavity. The plunger moves to and from the die between the positions shown in FIGURES 6 and 7. The lower face 36 of the plunger has the same configuration as the upper face of insert 16, i.e., an annular concentric groove 38 and a centrally located protrusion 40 for interlocking with annular rib 22 and recess 26 respectively. The press used in the present fabricating operation is a standard press of the type used in conventional impact extrusion operations and includes a knock-out pin 42 for ejecting the formed article from the die cavity as shown in FIGURE 8.

The blanks used in the present process consist of a disc-shaped blank or slug 44 of the metal, preferably wrought, which will form the cup-shaped portion 12 of the article and a blank of the same size and shape as the final insert 16. Slug 44 is slightly larger in diameter than the cavity of the die and is preferably in the wrought form, either stamped from rolled sheet or plate material or cut from extruded material, although cast slugs can be satisfactorily used. The insert blank is stamped from sheet material and formed by the stamping operation into the configuration shown in the drawings. This insert is slightly larger in diameter than the diameter of the plunger so that the marginal edge will form groove 18 during the fabricating procedure and will hold the insert firmly in place in the bottom of the article.

Figure 6:
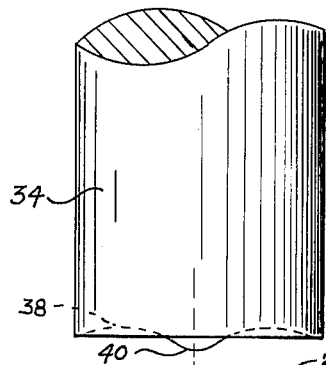
FIGURE 6 is a fragmentary vertical cross sectional view of the die and plunger employed in forming the present cup-shaped article, showing the plunger withdrawn from the die and the blanks from which the article is formed in position for the forming operation.
Figure 7:
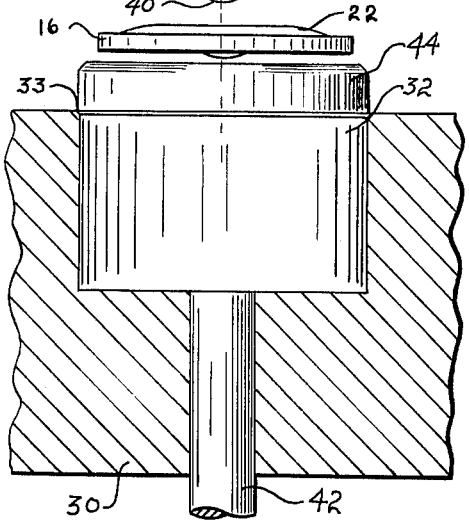
FIGURE 7 is a fragmentary vertical cross sectional view of the die and plunger shown in FIGURE 6, showing a cup-shaped article in cross section at the completion of the forming operation with the plunger at the end of its forming stroke.
Figure 7:
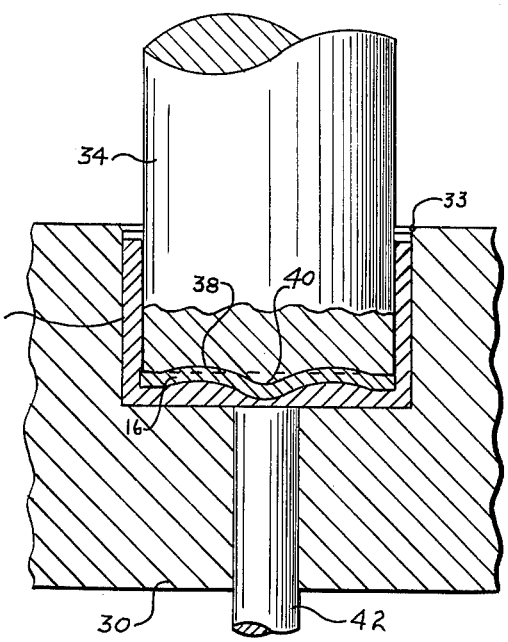

In carrying out the fabricating operation, with plunger 34 in its raised position and pin 42 withdrawn, as shown in FIGURE 6, metal slug 44 is first placed on the die plate 30 with its lower edge resting on annular beveled edge 33 and the preformed insert blank is placed on top of slug 44 in approximate axial alignment therewith. The press is then actuated and plunger 34 advanced rapidly downwardly, protrusion 40 first engaging the insert at recess 26, centering the insert with the plunger, and said protrusion and annular groove 38 interlocking with the recess and annular ridge 22 to hold the insert in exact alignment with the plunger throughout the extruding operation. During the downward stroke of the plunger, insert 16 in effect becomes a part of the plunger in forming the metal slug 44 into the cup-shaped portion 12. As the plunger advances downwardly into the die cavity, protrusion 40 engages the upper surface of slug 44 forcing the metal to flow outwardly from the protrusion into groove 38, expelling the air therefrom and completely filling the groove so that complete metal to metal contact is obtained and a solid duplex metal end portion of the article is formed. The metal of the slug is extruded upwardly between the marginal edge of insert 16 and the sides of the die cavity thence between the sides of the plunger and the sides of the cavity, flowing inwardly immediately above insert 16 to form groove 18 for retaining the insert firmly in place in the bottom of the article. The thickness of the end member is determined by the travel of plunger 34 into the die cavity and the thickness of the side wall 14 is determined by the spacing between plunger 34 and the walls of the cavity. After plunger 34 has reached its lowermost position shown in FIGURE 7, it is reversed and withdrawn from the die and article, and pin 42 is driven upwardly to eject the article from the die cavity, in the manner shown in FIGURE 8.

While the dimensions of the cup-shaped article 10 will normally be substantially correct upon the completion of the extrusion operation just described, if close tolerances are required for the diameter, a sizing operation may be necessary. A sizing machine is shown in part in FIGURE 9, consisting of a die plate 50 having a hole 52 therethrough of the exact diameter required for the article and a reciprocable cylindrical plunger 54 for forcing the article through the hole. The die plate and plunger are mounted in a suitable press and, with the plunger in its raised or withdrawn position, the cup-shaped article 10 is placed on the plunger or in hole 52 with the hollow interior facing the plunger. The article is advanced by the plunger through the hole reforming the article to the size of the die hole and is then ejected from the hole on the lower side of the die plate. The lower or forward end 56 of plunger 54 is preferably provided with the same configuration as the forward end of plunger 34 to assist in 'centering and retaining the article in exact alignment with hole 52 during the sizing operation.

Figure 2:
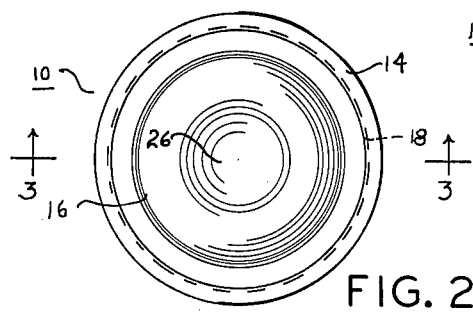
FIGURE 2 is a top plan view of the cup-shaped article shown in FIGURE 1.
Figure 1:
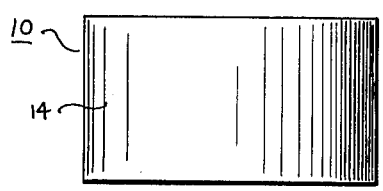
FIGURE 1 is a side elevational view of a cup-shaped article of duplex metal formed by my fabricating process.

The present invention is not limited to pistons but may be used advantageously in any application where a strong light cup-shaped article is required. The article has been described and referred to in the description of the fabricating process and in the claims with reference to the position shown in FIGURES 1, 2 and 3, i.e., with the closed end at the bottom. The article, however, may be fabricated and used in any other postion.

A modified form of insert may be used to form the cup-shaped article and still obtain some of the advantages of the structure just described. For example, ridge 22 and groove 24 may be eliminated and a disc flat on both sides, with the exception of a recess corresponding to recess 26 used in place of the one shown. This centrally located recess and a protrusion on the plunger corresponding to the one shown at numeral 40 perform the centering operation during the forming process.

Other changes and modifications can be made in my cup-shaped article and process for making the article without departing from the scope of the present invention.

I claim:

1. A process of fabricating cup-shaped pistons having a disc-shaped wear resistant and strengthening insert in the bottom thereof from a disc-shaped metal slug of relatively soft material and a preformed metal insert of lesser diameter than said slug and of a relatively hard material having a protrusion on one face and a recess on the other face complementary to and in the same relative location as said protrusion for receiving an actuating link, comprising placing said insert on said slug with the protrusion in contact therewith, axially aligning said insert and said slug, confining said slug on the bottom and sides in a die cavity, pressing said protrusion by a plunger into the contacting face of said slug initially and thereafter forcing the metal of said slug and insert into face to face contact from said protrusion radially outwardly to expel the air from between said slug and insert, thereafter forcing said plunger and insert into said slug, and continuing said plunger movement to elongate the marginal edge of said slug to form a cylindrical side wall portion.

2. A process of fabricating cup-shaped pistons having a wear resistant and strengthening insert in the bottom thereof from a disc-shaped slug of relatively soft metal, and a preformed insert of lesser diameter than said slug and of relatively hard metal having a protrusion on one face and a recess on the other face complementary to and in the same relative location as said protrusion, comprising placing said insert on said slug with the protrusion in contact therewith, axially aligning said insert and slug, confining said slug on the bottom and sides in a die cavity, pressing said protrusion by a plunger of smaller area on its free end than the adjacent surface of said slug into the contacting face of said slug initially and thereafter forcing the metal of said slug and insert into face to face contact from said protrusion radially outwardly, thereafter forcing said plunger and insert into said slug, and continuing said plunger movement to elongate the marginal edge of said slug to form a cylindrical side wall portion.

3. A process of fabricating cup-shaped pistons having a wear resistant and strengthening insert in the bottom thereof from a disc-shaped slug of relatively soft metal, and a preformed insert of lesser diameter than said slug and of relatively hard metal having a protrusion on one face and a recess on the other face, comprising placing said insert on said slug with the protrusion in contact therewith, axially aligning said insert and slug, confining said slug on the bottom and sides, pressing said protrusion by a plunger of smaller area on its free end than the adjacent surface of said slug into the contacting face of said slug initially and thereafter forcing the metal of said slug and insert into face to face contact from said protrusion radially outwardly, and thereafter forcing said plunger and insert into said slug to elongate the marginal edge of said slug to form a cylindrical side wall portion.

4. A process of fabricating cup-shaped articles having a wear resistant and strengthening insert in the bottom thereof from a disc-shaped metal slug and a preformed metal insert of lesser diameter and of less ductile metal than said slug, said insert having a protrusion on one face and a recess on the other face, comprising placing and axially aligning said insert on said slug with the protrusion in contact therewith, confining said slug on the bottom and sides, pressing said protrusion by a plunger of smaller area on its free end than the adjacent surface of said slug into the contacting face of said slug initially and thereafter forcing the metal of said slug and insert into face to face contact from said protrusion radially outwardly, and thereafter forcing said insert into said slug to elongate the marginal edge of said slug to form a cylindrical side wall portion.

5. A process of fabricating cup-shaped articles having a wear resistant and strengthening insert in the bottom thereof from a metal slug and a preformed metal insert of smaller size than said slug and of relatively hard metal, said insert having a protrusion on one side, comprising placing said insert on said slug with the protrusion in contact therewith, axially aligning said insert and slug, confining said slug on the bottom and sides, pressing said insert by a plunger of smaller area on its free end than the adjacent surface of said slug into the contacting face of said slug initially and thereafter forcing the metal of said slug and insert into face to face contact from the center outwardly, and thereafter forcing said insert into said slug to elongate the marginal edge of said slug to form a cylindrical side wall portion.

6. A process of fabricating bimetallic articles from a disc-shaped slug of relatively soft metal, and a preformed insert of lesser diameter than said slug and of relatively hard wear resistant metal, said insert having a protrusion on one side, comprising placing said insert on said slug with the protrusion in contact therewith, axially aligning said insert and slug, confining said slug on the bottom and sides in a die cavity, pressing said insert by a plunger of smaller area on its free end than the adjacent surface of said slug into the contacting face of said slug initially and thereafter forcing the metal of said slug and insert into face to face contact from the center outwardly, and thereafter forcing said plunger and insert into said slug to effect backward longitudinal extrusion of the slug and elongating the marginal edge of said slug around the edges of said insert.

7. A process of fabricating cup-shaped pistons having a wear resistant and strengthening insert in the bottom thereof from a disc-shaped slug of relatively soft metal, and a preformed insert of lesser diameter than said slug and of relatively hard metal having a protrusion on one face and a recess on the other face, comprising placing said insert on said slug with the protrusion in contact therewith, axially aligning said insert and slug, confining said slug on the bottom and sides, pressing said protrusion by a plunger of smaller area on its free end than the adjacent surface of said slug into the contacting face of said slug initially and thereafter forcing the metal of said slug and insert into face to face contact from said protrusion radially outwardly, thereafter forcing said plunger and insert into said slug to elongate the marginal edge of said slug to form a cylindrical side wall portion, and deforming said side wall portion to the desired dimensions.

8. The method of making a piston, which comprises, confining a slug of relatively soft material on the bottom and sides in a die cavity, placing upon the upper side of the slug and in axial alignment therewith a reinforcing insert of lesser diameter than the diameter of the slug and of relatively hard material and having a protrusion on the face in contact with the slug and a recess on the other face complementary to and in the same relative location as said protrusion for receiving an actuating link, and pressing the insert against the slug initially to press the protrusion on the insert into the slug to expel any air from between the slug and the insert and to flow the material of the slug radially outwardly against the die wall and upwardly around the periphery of the insert to form a generally cylindrical side wall of the piston.

References Cited by the Examiner
UNITED STATES PATENTS

| | | | |
|---|---|---|---|
| 1,295,512 | 2/1919 | Jockmus | 29—190 |
| 1,720,722 | 7/1929 | Dean. | |
| 1,752,982 | 4/1930 | Herold | 29—522 X |
| 1,802,843 | 4/1931 | Singer. | |
| 1,848,083 | 3/1932 | Wetherald. | |
| 1,939,553 | 12/1933 | Hill et al. | 29—522 |
| 2,123,163 | 7/1938 | Brown | 29—190 |
| 2,453,503 | 11/1948 | Emmons | 29—522 |
| 2,778,494 | 1/1957 | Kreidler | 207—9 |
| 2,795,467 | 6/1957 | Colwell. | |
| 2,908,073 | 10/1959 | Dulin | 29—493 X |

FOREIGN PATENTS

| | | |
|---|---|---|
| 823,002 | 10/1937 | France. |
| 497,270 | 12/1938 | Great Britain. |

WHITMORE A. WILTZ, *Primary Examiner.*

JOHN F. CAMPBELL, NEDWIN BERGER,
*Examiners.*